United States Patent
Vaswani et al.

(10) Patent No.: US 9,658,081 B2
(45) Date of Patent: May 23, 2017

(54) METHODS AND SYSTEM FOR UTILITY NETWORK OUTAGE DETECTION

(75) Inventors: Raj Vaswani, Portola Valley, CA (US); James Pace, San Francisco, CA (US); Sterling Hughes, Oakland, CA (US)

(73) Assignee: Silver Spring Networks, Inc., San Jose, CA (US)

(*) Notice: Subject to any disclaimer, the term of this patent is extended or adjusted under 35 U.S.C. 154(b) by 894 days.

(21) Appl. No.: 12/966,298

(22) Filed: Dec. 13, 2010

(65) Prior Publication Data
US 2011/0077790 A1    Mar. 31, 2011

Related U.S. Application Data

(63) Continuation of application No. 11/804,223, filed on May 17, 2007, now Pat. No. 7,853,417.

(60) Provisional application No. 60/898,551, filed on Jan. 30, 2007.

(51) Int. Cl.
*G01D 4/00* (2006.01)
*H04Q 9/00* (2006.01)

(52) U.S. Cl.
CPC ............... *G01D 4/004* (2013.01); *H04Q 9/00* (2013.01); *H04Q 2209/60* (2013.01); *H04Q 2209/86* (2013.01); *Y02B 90/242* (2013.01); *Y02B 90/246* (2013.01); *Y04S 20/322* (2013.01); *Y04S 20/36* (2013.01); *Y04S 20/42* (2013.01)

(58) Field of Classification Search
CPC .................................................. G01D 4/004
USPC ................... 702/57–62, 187, 188; 340/870.01–870.03, 870.11, 870.16, 635; 700/291, 293, 295, 296, 297
See application file for complete search history.

(56) References Cited

U.S. PATENT DOCUMENTS

| 3,411,140 A | 11/1968 | Halina et al. |
| 5,553,094 A | 9/1996 | Johnson et al. |
| 5,568,399 A | 10/1996 | Sumic |
| 5,673,252 A | 9/1997 | Johnson et al. |
| 6,195,018 B1 | 2/2001 | Ragle et al. |

(Continued)

FOREIGN PATENT DOCUMENTS

| EP | 0493964 | 7/1992 |
| JP | 05236544 | 9/1993 |

(Continued)

OTHER PUBLICATIONS

Office Action from the Mexican Patent Office for Application No. MX/a/2008/006309 dated Jun. 15, 2010 (2 pages).

(Continued)

*Primary Examiner* — Ricky Ngon
(74) *Attorney, Agent, or Firm* — Artegis Law Group, LLP

(57) ABSTRACT

The present invention provides a system including a utility network including a product distribution pathway for delivering a product, a plurality of electronic utility devices associated with the utility network to monitor at least one parameter associated with the product distribution pathway, and a management processor in communication with the devices and operable to poll at least a subset of the electronic utility devices in response to an input to evaluate performance of one of the utility network and the system in response to information relating to the at least one parameter. The evaluation can include a rule-based analysis of one of the parameter and the information relating to the parameter.

23 Claims, 7 Drawing Sheets

(56) References Cited

U.S. PATENT DOCUMENTS

| | | | |
|---|---|---|---|
| 6,362,745 | B1 | 3/2002 | Davis |
| 6,392,996 | B1 | 5/2002 | Hjalmtysson |
| 6,424,248 | B1 | 7/2002 | Toms et al. |
| 6,492,910 | B1 | 12/2002 | Ragle et al. |
| 6,590,928 | B1 | 7/2003 | Haartsen |
| 7,149,917 | B2 * | 12/2006 | Huang et al. ............ 714/4.3 |
| 7,227,462 | B2 | 6/2007 | Spencer |
| 7,290,037 | B2 | 10/2007 | Clark et al. |
| 7,304,587 | B2 | 12/2007 | Boaz |
| 7,308,370 | B2 | 12/2007 | Mason, Jr. et al. |
| 7,379,981 | B2 | 5/2008 | Elliott et al. |
| 7,394,394 | B2 | 7/2008 | Lockhart et al. |
| 2002/0082748 | A1 | 6/2002 | Enga et al. |
| 2003/0001754 | A1 * | 1/2003 | Johnson et al. ......... 340/870.02 |
| 2004/0024717 | A1 | 2/2004 | Sneeringer |
| 2004/0138787 | A1 | 7/2004 | Ransom et al. |
| 2004/0139038 | A1 | 7/2004 | Ehlers et al. |
| 2005/0033707 | A1 | 2/2005 | Ehlers et al. |
| 2005/0078660 | A1 | 4/2005 | Wood |
| 2006/0064485 | A1 | 3/2006 | Baron et al. |
| 2006/0168191 | A1 | 7/2006 | Ives |
| 2006/0202854 | A1 * | 9/2006 | Spencer ............ 340/870.02 |
| 2008/0036622 | A1 * | 2/2008 | Spencer ............ G01D 4/004 340/870.16 |
| 2008/0048883 | A1 * | 2/2008 | Boaz ............ 340/870.02 |
| 2008/0189225 | A1 * | 8/2008 | Herring et al. ............ 705/400 |

FOREIGN PATENT DOCUMENTS

| | | |
|---|---|---|
| JP | 2002369412 | 12/2002 |
| TW | 200422629 | 11/2004 |
| TW | 200521442 | 7/2005 |
| WO | 9729466 | 8/1997 |
| WO | 2006102172 | 9/2006 |

OTHER PUBLICATIONS

Liu et al.: "Integrated Fuzzy Filter for Distribution Outage Information" Oct. 28, 2002, Electric Power Systems Research, vol. 63, Issue 3 whole document, especially pp. 3 and 6.

C. Edward Chow, John Bicknell, Steve McCaughey and Sami Syed; "A Fast Distributed Network Restoration Algorithm", 1993 IEEE, pp. 261-267, 0-7803-0922, Jul. 1993, USA.

Krishna Sridharan, Noeln N. Schulz, "Outage Management Through AMR Systems Using an Intelligent Data Filter", IEEE Transactions on Power Delivey, vol. 16, No. 4, pp. 669-675, Oct. 2001, USA.

John Bicknell, C. Edward Chow and Sami Syed, "Performance Analysis of Fast Distributed Network Restoration Algorithms", 1993 IEEE, pp. 1596-1600, 0-7803-0917-0/93, USA.

Rochelle A. Fischer, Aaron S. Laakonen, Noel N. Schulz, "A General Polling Algorithm Using a Wireless AMR System for Restoration Confirmation", IEEE Transactions on Power Systems, May 2001, pp. 312-316, vol. 16, No. 2, USA.

Document entitled "Outage Reporting Example" from Schneider Electric, publicly available prior to May 17, 2007.

Patti Harper-Slaboszewicz, How to Improve Outage Management (UtiliPoint.com—Jan. 18, 2006),Powermarketers Industry Publications, Jan. 18, 2006, USA.

PCT/US2007/73457 International Search Report and Written Opinion, dated Mar. 14, 2008.

PCT/US2008/001163 International Search Report and Written Opinion, dated Nov. 26, 2008.

US Office Action for U.S. Appl. No. 11/804,223, dated Jul. 14, 2009, (63 pages).

SG Search Report, dated Oct. 22, 2010, (6 pages).

Yan Liu, "Distribution System Outage and Restoration Analysis Using A Wireless AMR System", 2002, IEEE, pp. 871-875.

Sioe T. Mak, "A Synergistic Approach to Using AMR and Intelligent Electronic Devices to Determine Outages in a Distribution Network", Mar. 2006, IEEE, pp. 447-453.

TW 096126011 Taiwan Search Report dated Mar. 25, 2011 (English Translation—7 pages).

Examination Report from the Hungarian Intellectual Property Office for Application No. 200905059-2 dated Jun. 14, 2011 (6 pages).

Examination Report from the Australian Patent Office for Application No. 2011213894 dated Mar. 29, 2012 (2 pages).

Examination Report from the Malaysian Patent Office for Application No. 20093137 dated Mar. 23, 2012 (Translation, 3 pages).

Office Action from the Intellectual Property Office Philippines for Application No. 12009501405 dated Jan. 21, 2012 (1 page).

Office action from the Japanese Patent Office for Application No. 2009-548237, issued Jul. 2012, 5 pages.

* cited by examiner

METHODS AND SYSTEM FOR UTILITY NETWORK OUTAGE DETECTION

RELATED APPLICATIONS

The present application is a continuation of prior filed co-pending U.S. patent application Ser. No. 11/804,223, filed on May 17, 2007 which claims the benefit of prior filed U.S. Provisional Patent Application Ser. No. 60/898,551, filed Jan. 30, 2007, the entire content of each are hereby incorporated by reference.

FIELD OF THE INVENTION

The present invention relates to utility networks and, more particularly, to a utility network management system and a method of operating a utility management system for monitoring and controlling the utility grid and automated reading of utility meters.

SUMMARY

The present invention provides a utility network management system including an outage detection system ("ODS"), which manages identification of some or substantially all outage events in a utility grid. The ODS can also manage restoration actions. The ODS can also or alternatively maintain extensive up-to-date topology information of the grid-service area.

As used herein, the term "outage" includes, among other things, a loss of power or utility service to electronic utility devices and locations supported by those devices within a utility grid, and the term "restoration" includes, among other things, the reestablishment of power or other utility service to such devices and locations. As used herein the term "utility devices" includes, among other things, electric meters, other communications devices, faulted circuit indicators, and other distribution automation devices, such as, for example, capacitor bank controllers, transformers, switch reclosures, etc.

The present invention provides a method and an end-to-end system, components, and information flow architecture used to assist in outage and restoration management of a utility network. The method and system of the present invention can also or alternatively be used to gather information rapidly and accurately, and manage outages (e.g., failures) and restoration events of a network used to deliver services and/or utilities to end users across a networked infrastructure. For example, the method and system of the present invention can be efficiently used for outage and restoration management of an electrical utility grid infrastructure.

Utilities currently deploy fairly limited systems in order to perform outage and restoration management. As used herein, such limited systems are referred to as "ODS function" or "ODS", restoration-management inclusive. The ODS can be tightly coupled or integrated with a network management function. In some embodiments, ODS capability is implemented as a third-party, external system. To date, ODS are limited due to the fact that there is very little in terms of outage sensing/monitoring instrumentation in devices downstream from the substation. And, where there is instrumentation, providing network connectivity to these devices has been cost-prohibitive historically, and therefore is rather limited or non-existent.

ODS, at set up time, has information in an underlying database that relates a premise/premise_id/service_point to components in the utility's physical topology (i.e., the physical layout of a distribution network infrastructure with specific identification of some or substantially all of the components of the network arranged in a hierarchical manner). These components can be relatively static devices, such as, for example, feeders and transformers.

Outage and restoration data input into ODS have historically been generated by customer phone calls. The call can be fielded by a human operator, and the state of the premise (e.g., incorrectly energized or not energized meter) is manually input into the ODS. With the advent of computer-telephony integration, the customer can indicate with a dial tone entry whether or not service is being provided at the customer location. The ODS module, once populated with this information, can attempt to perform a basic correlation (i.e., a "prediction") as to the extent of the outage or the remainder of the outage, when restoration is occurring. This is accomplished by synthesizing customer-call information received at the ODS.

A simple example of an outage event sequence works as follows: Caller #1 from premise_id '0001' calls in to report an interruption of service. The ODS module flags this instance as being related to "feeder 1" and "transformer X". Subsequently, other callers from that same feeder call in, also reporting outages. The ODS module tries to relate the outage to a particular transformer, for instance, by "walking up" a hierarchical topology tree within the ODS module that represents the connectivity structure of the power grid. The utility topologies can be more complex than the one described above and, in many cases, can include more complex topology, automated switch closures, etc.

Improved ODS functionality is attractive to utilities due to the increased automation, and concomitant operational efficiency, they provide. Regulators reward utilities based on reliability metrics, such as, for example, sum of all customer interruption durations ("SAIDI," which refers to the sum of all customer interruption durations), customer average interruption duration index ("CAIDI," which is derived from SAIDI), and/or system average interruption frequency index ("SAIFI," which refers to the total number of customer service interruptions), etc. Utilities can benefit from achieving better control over outage management, quicker fault isolation, and service restoration.

The method and system of the present invention can make use of the networked meters and other devices of the transmission and distribution infrastructure. In some embodiments, the method and system of the present invention can achieve an improved dynamic network management system or system-backup, by leveraging a larger number of "sensors" (e.g., smart, networked meters) distributed broadly (i.e., at a number of different locations) and deeply (i.e., at or adjacent a variety of different elements) throughout the utility grid. Reachability information from these sensors is used to assist in outage/restoration management. As used herein the term "reachability" refers to a measure of the ability to send data to and receive data from an electronic utility device or another network infrastructure device. With the improved ODS capability achieved with the method and system of the present invention, utilities can achieve significant cost savings and improved customer service. Costly manual check and restoration methods can be reduced and/or avoided.

The method and system of the present invention can notify a utility company ODS of an outage, verify an outage and detect the extent of the outage, verify a restoration and detect the extent of any secondary outages, and/or calculate key outage statistics that regulated utilities are required to maintain. In offering the capabilities and features described above, the method and system of the present invention can operate as an ODS in an autonomous manner, or it can serve as a support infrastructure to facilitate a smart ODS system to detect and manage outage and restoration events.

The method and system of the present invention can have at least two different network topologies. The first of these topologies can include a "smart" gateway between a utility network management center ("NMC," which can also or alternatively be referred to as the Network Back Office System or "BOS") and a meter. The second of these topologies can operate without a "smart" gateway between the NMC and the meter. In some embodiments, the NMC can be a radio network management controller that interfaces with a utility control system and can execute some or all of the functions designated (e.g., remote automated meter reading, consumption data gathering and analysis, outage and service restoration management support, and others). The NMC can also or alternatively control the two-way information flow between the electronic utility devices (e.g., customer premise meters) and network control.

The present invention provides a system including a utility network having a product distribution pathway for delivering a product, a plurality of electronic utility devices associated with the utility network to monitor at least one parameter associated with the product distribution pathway, a management processor in communication with the devices and operable to poll at least a subset of the electronic utility devices in response to an input to evaluate performance of one of the utility network and the system in response to information relating to the at least one parameter. The evaluation can include a rule-based analysis of one of the parameter and the information relating to the parameter.

The present invention also provides a method of monitoring a utility network. The method can include the acts of monitoring at least one parameter associated with performance of the utility network with a plurality of electronic utility devices associated with a product distribution pathway of the utility network, communicating information relating to the parameter to a management processor, and polling at least some of the electronic utility devices in response to an input to determine whether there is a performance problem associated with the utility network. The method can also include the act of performing a rule-based analysis of one of the parameter and the information relating to the parameter.

In addition, the present invention provides a software program stored in machine readable code and used to manage a utility network. The utility network can include a product distribution pathway and a plurality of electronic utility devices associated with the product distribution pathway. The electronic utility devices can monitor at least one parameter associated with performance of the utility network and can communicate information relating to the parameter to a management processor. The software can include a control module for evaluating the performance of the utility network based on the parameter, and program code operable to poll at least a subset of the electronic utility devices in response to an input to confirm whether the information relating to the parameter indicates a problem associated with the utility network.

The present invention also provides a method of managing performance problems in a utility network. The method can include the acts of polling a subset of a plurality of electronic utility devices associated with a product distribution pathway of the utility network for information relating to at least one parameter associated with performance of the polled utility meters, and determining whether there is a performance problem from the information received in response to polling.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

As should be apparent to one of ordinary skill in the art, the systems and networks shown in the figures are models of what actual systems or networks might be like. As noted, many of the modules and logic structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the invention is not limited to the specific examples or terminology or to any specific hardware or software implementation or combination of software or hardware.

Figure 1:
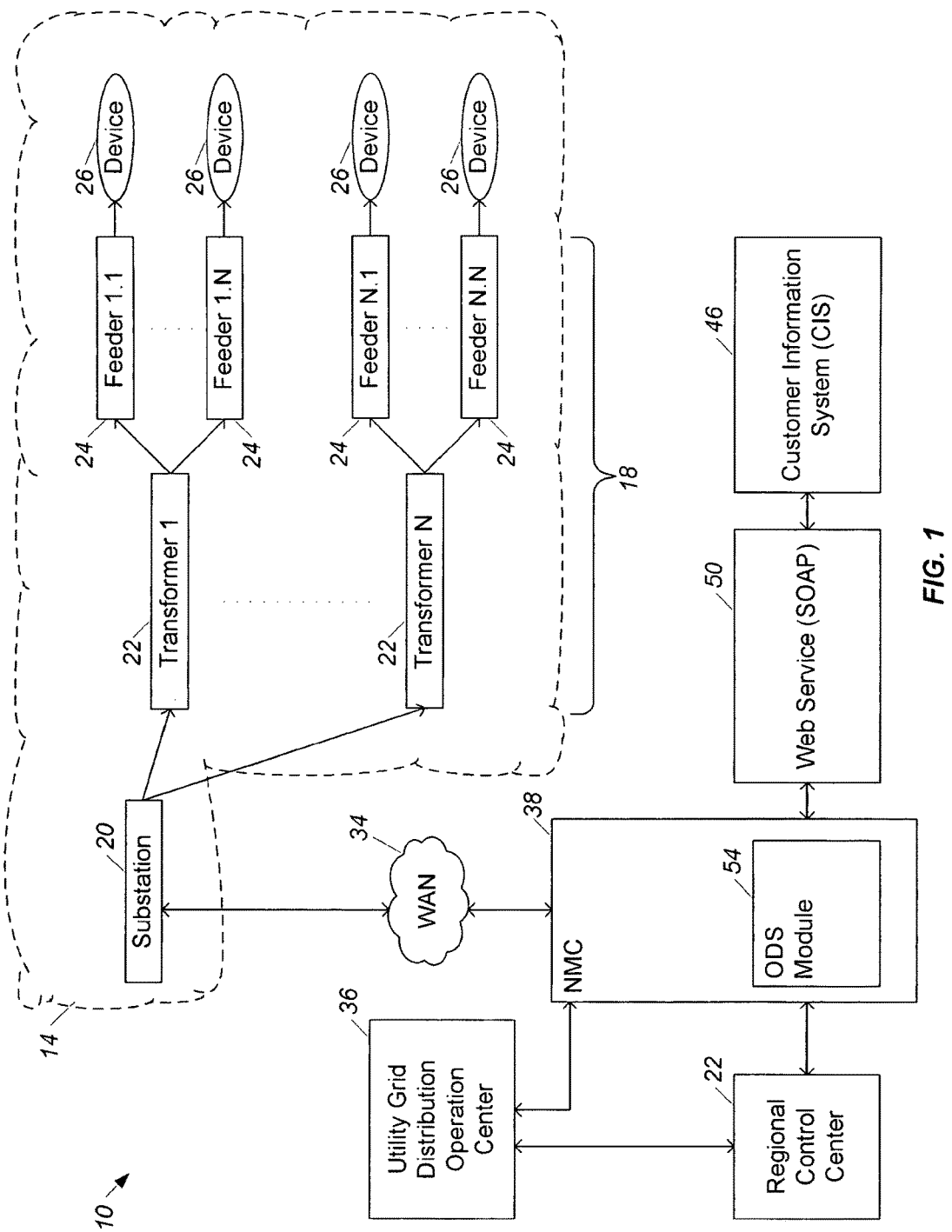
FIG. 1 is a schematic illustration of a utility grid topology and an outage detection system according to some embodiments of the present invention.
Figure 2:
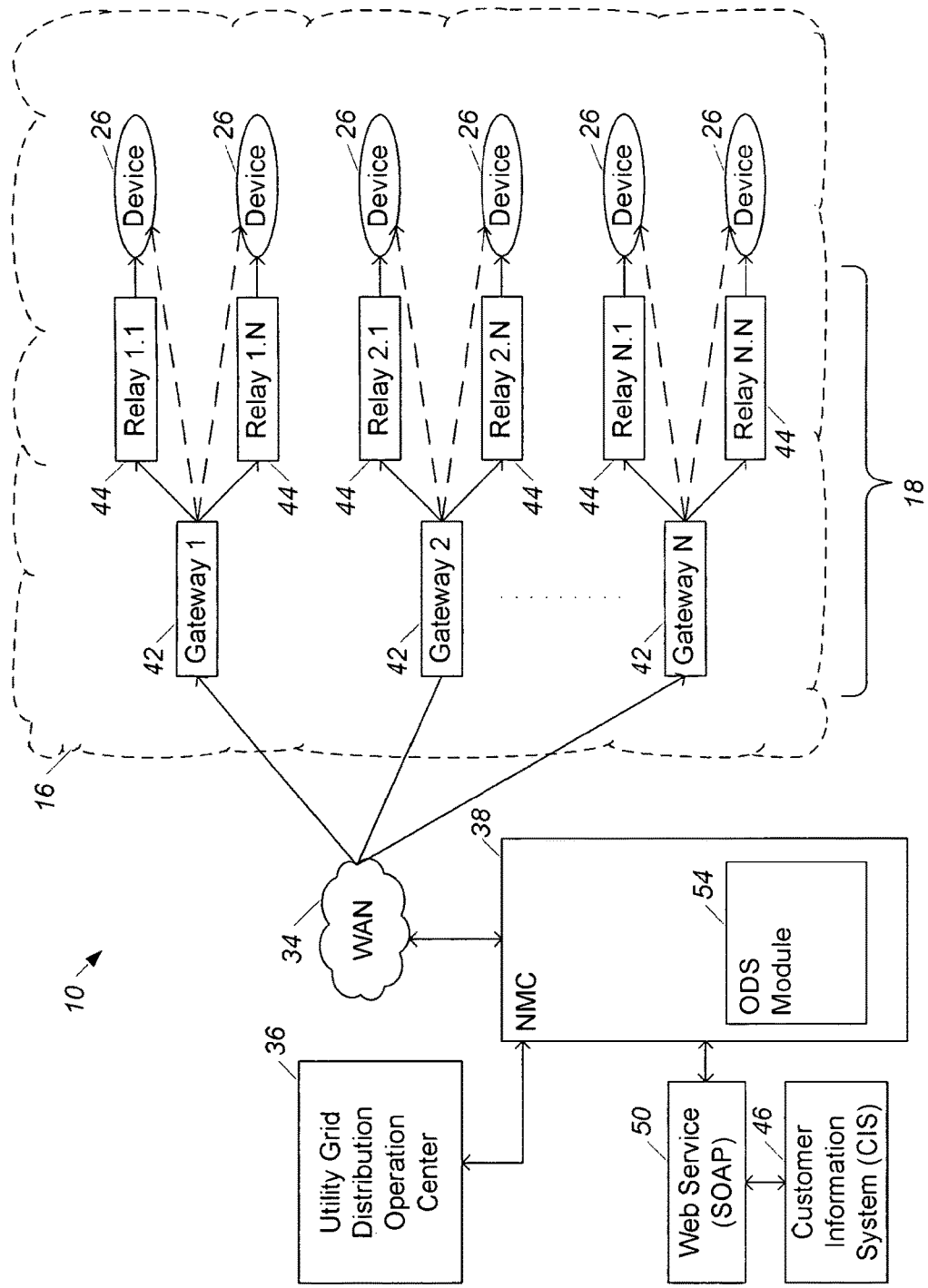
FIG. 2 is a detailed schematic illustration of the utility grid topology and the outage detection system show in FIG. 1.

FIGS. 1 and 2 illustrate an outage detection system 10 ("ODS") for managing the identification of some or substantially all outage events in a utility grid or utility network 14 having a number of electronic utility devices 26 deployed along product distribution pathways of the utility grid 14. The electronic utility devices 26 monitor at least one parameter associated with the product distribution pathways. In some embodiments and as explained below, the ODS 10 can also or alternatively manage restoration activities and/or maintain up-to-date topology information of the grid service area. While reference is made herein to an electric utility and a utility grid 14 for power distribution, it should be understood that the systems and methods described herein can also or alternatively be used with other utilities, such as, for example, water, gas, and/or other measurable and widely distributed services, and also in any other instrumented electrical devices (e.g., street lights).

As shown in FIGS. 1 and 2, the utility grid 14 is deployed by a utility company in a topology designed to serve customers in a service area, with a distributed hierarchical network of network infrastructure devices 18 (e.g., communication nodes, gateways 42, relays 44, substations 20, transformers 22, and feeder stations 24), a utility grid distribution operations center 36, and regional control centers 30. A communications network can facilitate communications between the elements of the outage detection system 10. As shown in FIGS. 1 and 2, the communications network can include a first network (e.g., a local area network ("LAN")) 16, which can overlay and provide communication between elements of the utility grid 14, and a second network 34 (e.g., a wide area network ("WAN"), which can link the electronic utility devices 26, relays 44, and gateways 42 in the field with a utility grid distribution operation center 36 and a network interface of a network management center 38 ("NMC") to provide automated meter reading, grid control and monitoring operations. In other embodiments, a single network or three or more networks can facilitate communications between the elements of the ODS 10 (e.g., the network infrastructure devices 18, the utility grid distribution operations center 36, and the NMC 38).

In the illustrated embodiment, the NMC 38 can communicate with gateways 42 over the second network 34, and the gateways 42 can communicate with relays 44 and/or electronic utility devices 26 over the first network 16. (As used herein the terms "access point" and "gateway" are used interchangeably.) The first network 16 may cover the utility grid area and its topology and may or may not match the grid infrastructure topology. In some embodiments, the electronic utility devices 26, the relays 44, and gateways 42, the NMC 38 an agent of the NMC 38, and/or the network infrastructure devices 18 include frequency-hopping spread spectrum communication protocol capability, broadband communication capability, IPv4 communication capability, IPv6 communication capability, modulation, direct-sequence spread spectrum modulation, and/or orthogonal frequency-division multiplexing modulation capability.

As shown in FIG. 2, the gateways 42, relays 44 and/or one or more of the electronic utility devices 26 can act as an agent of the NMC 30 to extend the operational reach of the first network 16 and/or the second network 34. The relays 44 can be placed high for best line-of-sight to electronic utility devices 26. Several electronic utility devices 26 can be associated with each relay 44 and several relays 44 can be associated with a gateway 42. In some embodiments, an electronic utility device 26 can also or alternatively function as a relay 44. For example, the electronic utility devices 26 can include a network interface card ("NIC") that enables the electronic utility devices 26 to maintain two-way communications with the NMC 38 via relays 44 and/or gateways 42. In some embodiments, the electronic utility devices 26 and/or the relays 44 may have direct two-way communications over a private network such that the electronic utility devices 26 can communicate with other elements of the ODS 10 without sending transmissions through the gateways 42 and/or the first network 34.

The gateways 42 can execute schedules (i.e., a listing of which electronic utility devices 26 are read and when, including, for example, a start date and time, an optional end date and time), collect data from the electronic utility devices 26 over the first network 16, and/or forward read data upstream to the NMC 38. The gateways 42 can also or alternatively perform network management functions such as route calculation and reachability pings or queries, which test the reachability of electronic utility devices 26 on the first and second networks 16, 34. In some embodiments, a ping program sends a packet (which can include, among other things, a header containing data, such as, for example, destination address, and a payload including application data, such as, for example, interval read results) to an electronic utility device 26 and returns data indicating how long, in milliseconds, the packet took to reach the electronic utility device 26 and return.

A reachable electronic utility device 26 is usually readable. However, in some instances, an electronic utility device 26 may be reachable with small packet sizes, but may not be reachable with the larger packet sizes.

Communication routes can be established between the gateways 42, the associated relays 44, and one or more electronic utility devices 26. The routes can be network-discovered. A network-discovered route can be determined automatically by a gateway 42 when a new electronic utility device 26 is activated and it broadcasts a discovery message across the first network 16. A static route can be a user-defined route saved and used for subsequent communications. A user-defined static route can override some or all network-discovered routes. When performing an on-demand ping, a user can specify a one-time route to a destination that is not saved or reused.

In other embodiments, the electronic utility devices 26 receive, evaluate, and use path cost and link cost information from neighboring elements to determine a prioritized list of next-hop neighboring elements. The electronic utility devices 26 then send packet information to the next-hop neighboring elements, which forward the information through a gateway 42 and across the first and second networks 16, 34 to the NMC 38.

As shown in FIGS. 1 and 2, the NMC 38 can interface with the utility grid distribution center 36. The NMC 38, with its two-way communications access to the electronic utility devices 26 at customer premises in the utility grid 14 via the first network 16, performs the functions of ODS. In some embodiments, the ODS functions are efficiently performed by leveraging the inherent features and capabilities of the two-way communications of the first and second networks 16, 34 linking the NMC 38 with the electronic utility devices 26.

Some of the embodiments of the ODS 10 disclosed herein may include an NMC 38 and customer-premise electronic utility devices 26 consisting of constant powered devices ("CPDs") with or without battery backup, and battery powered devices ("BPDs"), which communicate with the NMC 38 via relays 44 and gateways 42 over the first and second networks 16, 34. In these embodiments, the NMC 38 can maintain accurate status data relating to the utility grid 16 and scheduled and unscheduled retrieval/reporting of meter readings and utility consumption data resident in the electronic utility devices 26. The CPDs can also or alternatively powered by the utility grid 14.

Figure 3:
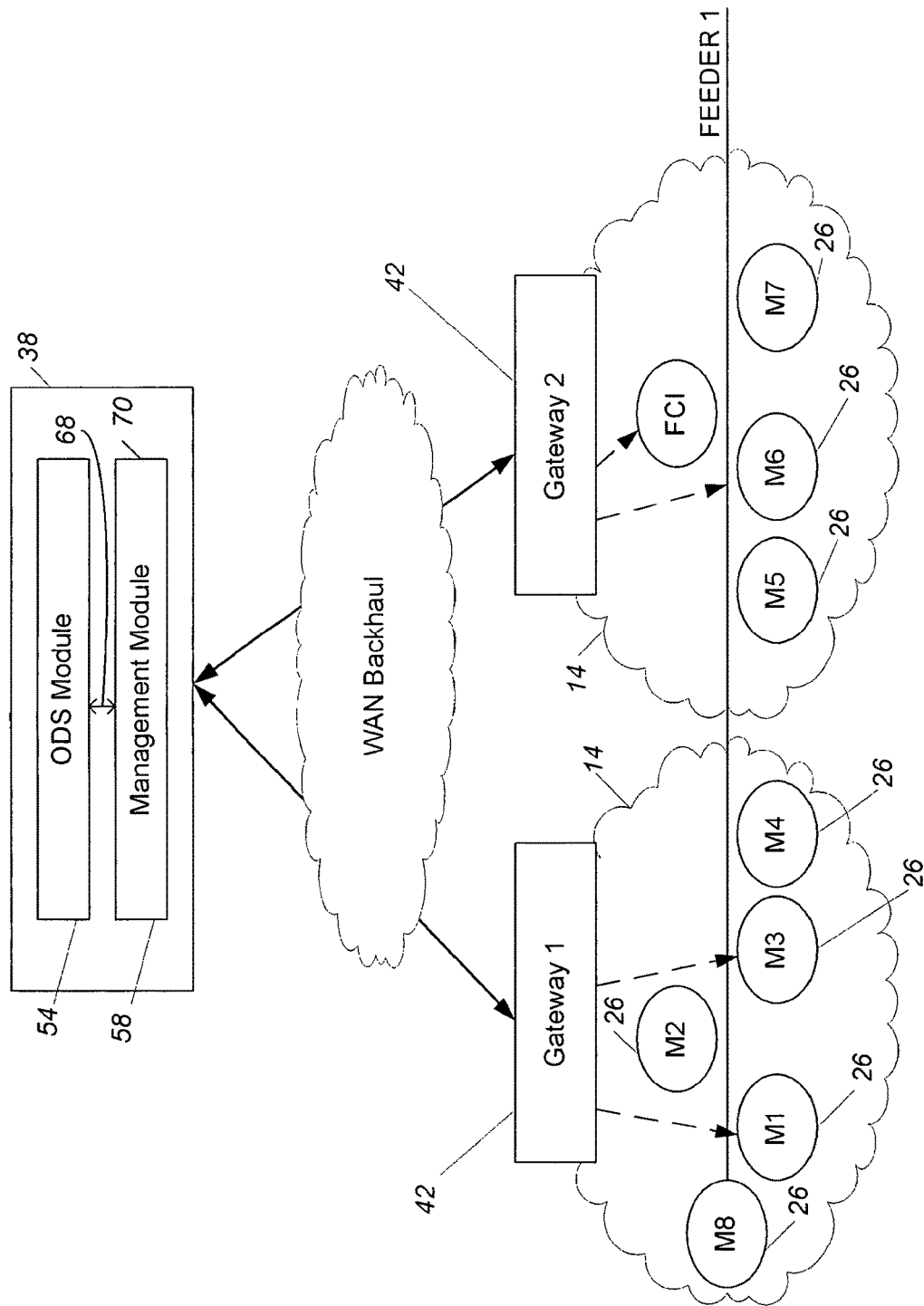
FIG. 3 is a schematic illustration of a management module and an outage detection module of the outage detection system shown in FIGS. 1 and 2.

As shown in FIG. 2, the NMC 38 can include a first logic component (e.g., an ODS module 54) and a second logic component (e.g., a back office management module 58), which in the illustrated embodiment of FIG. 3 manage, in tandem, downstream utility devices 26. As shown in FIG. 3, the NMC 38, can also communicate with other components of the utility grid 14 via the first and second networks 16, 34, including some or all of the network infrastructure devices 18 and some or all of the electronic utility devices 26. In some embodiments, the ODS module 54 can communicate with elements of the utility grid 14 through the management module 58, which can include a communications module operable to transmit queries to the utility grid 14 through a communications network interface and the first and second networks 16, 34. The NMC 38 and the individual elements of the NMC 38 (e.g., the ODS module and the back office management module 58) can have a number of different locations, can be distributed between multiple locations, or can be stored in a single combined location.

As used herein, the term "downstream" refers to a direction of a communications route whereby data travels towards an electronic utility device 26, and, as used herein, the term "upstream" refers to a direction of a communications route whereby data travels towards the NMC 38 from an electronic utility device 26.

As shown in FIG. 3, the NMC module 58 can communicate over a WAN backhaul with other components of the utility grid 14 covered by the first network 16. Gateways 42 distributed throughout the utility grid 14 (e.g., mounted on pole tops) can communicate with other network infrastructure devices 18 and with the electronic utility devices 26. Relays 44 can be distributed throughout the utility grid 14 (e.g., mounted on pole tops), and can communicate with other network infrastructure devices 18 and the electronic utility devices 26. Networked electronic utility devices 26 can be positioned at customer locations and/or other locations needed for monitoring throughout the utility grid 14.

The ODS module 54 and the management module 58 communicate via transmission control protocol/internet protocol ("UDP/IP") and web services application program interfaces ("APIs") (i.e., the routines, protocols, and tools, for interfacing with a software program). IP suites of protocols are suites of communications protocols used to connect hosts on the Internet. The IP protocol suite can be built into a UNIX operating system and can be used with the Internet, making it a standard for transmitting data over networks. IPv4 and IPv6 are among the packet protocols used in the ODS system 10.

As used herein, the term "protocol" includes, among other things, an agreed-upon format for transmitting data between two or more elements of the utility grid 14. A protocol can be a convention or standard that controls or enables the connection, communication, and data transfer between two computing endpoints. A protocol can also or alternatively include the rules governing the syntax, semantics, and/or synchronization of communication data. Protocols can be implemented by hardware, software, or a combination of the two. A protocol can also or alternatively define the behavior of a hardware connection. A communications protocol can include a set of standard rules for data representation, signaling, authentication, and error detection required to send information over a communications channel. A network protocol can define a "language" of rules and conventions for communication between network infrastructure devices 18 and electronic utility devices 26. A protocol can also or alternatively include formatting rules that specify how data is packaged into messages. Alternatively or in addition, a protocol can include conventions, such as, for example, message acknowledgement or data compression to support reliable and/or high-performance network communication. The Internet protocol family can include IP and other higher-level network protocols built on top of it, such as, for example, TCP, UDP, HTTP, FTP, ICMP, and SNMP.

In some embodiments, the ODS module 54 and the management module 58 can be tightly coupled or integrated, such as, for example, within a given program or residing on a given computer. Alternatively, the ODS module 54 and the management module 58 can communicate using other protocols or interfaces. In the illustrated embodiment, the NMC 38 and the gateways 42 communicate over TCP/IP on a variety of physical media (1×RTT, POTS dialup, Ethernet, etc.) across the second network 34, and the gateways 42, relays 44 and/or electronic utility devices 26 communicate over IPv4 and IPv6 across the first network (e.g., a wireless network) 16. In other embodiments, the electronic utility devices 26 and/or the network infrastructure devices 18 can communicate directly with the NMC 38 via a wireless network (CDMA 1×RTT, GPRS, CDMA-EVDO, CDMA-2000, WCDMA, WiMax, and the like).

The ODS module 54 can upload utility grid topology data to the NMC 38, via a simple object access protocol ("SOAP") 50, which sends extensible markup language-formatted ("XML-formatted") requests to a server over HTTP and receives a response back in XML-format. Because HTTP is a standard and accepted mode of communication on the Internet and most web servers recognize and respond to HTTP requests, one or more elements of the ODS module 54 can be integrated relatively easily. In addition, XML is a standard mode of communication to exchange information over various systems. Therefore, the use of XML to send and/or receive messages enables any system on any platform to read and process the messages, unlike proprietary formats. In other embodiments, the ODS module 54 or elements of the ODS module 54 can also or alternatively send or receive messages having other formats, which can be proprietary or non-proprietary. Additionally, HTTPS may be used for security.

External systems, such as, for example, a customer information system ("CIS") 46 can also or alternatively upload utility topology information to the NMC 38. A CIS 46 is a database which, alone or in combination with other system elements, stores meter and customer data and profiles. The data in the CIS database can also or alternatively include grid topology data. Alternatively or in addition, a legacy utility OMS or grid information system ("GIS") (i.e., hardware and/or software used to facilitate management of resources) may provide topology data.

Figure 4:
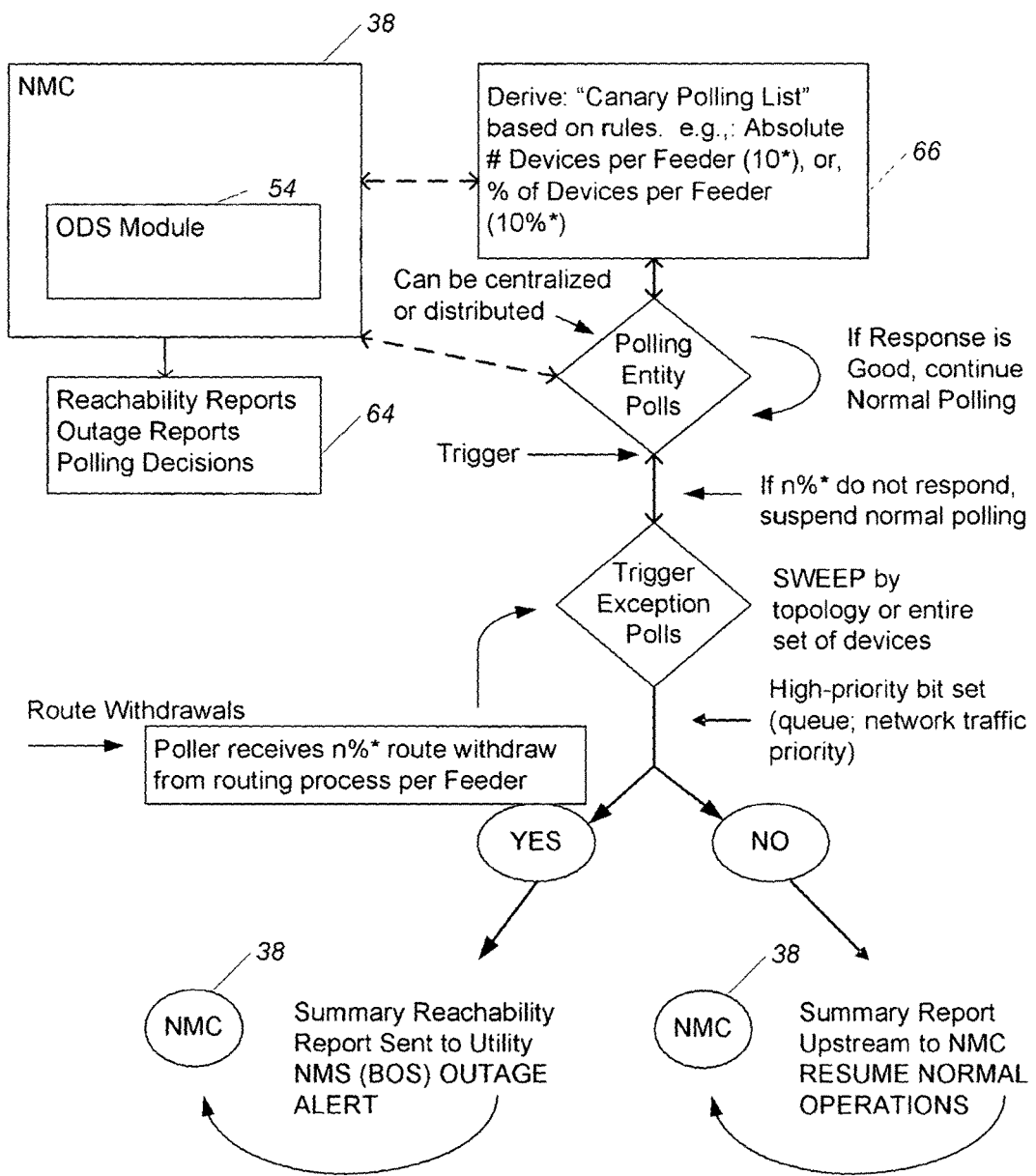
FIG. 4 is a process flow diagram of the outage detection system shown in FIGS. 1-3.

The NMC 38 generates "reachability polling schedules" and polling reports 64 (as shown in FIG. 4) for key parts of the topology (e.g., Feeder 1). The polling schedules can include a set of devices 26 that are identified as reliable by virtue of application layer network reachability statistics and network access criteria. The length of the polling schedule is configurable based on the extent and/or distribution of the utility infrastructure. For example, the length of a polling schedule can be configurable based on the number of highly reliable devices per feeder and/or the percentage of highly reliable devices per feeder.

Alternatively or in addition, the presence of a faulted circuit indicator ("FCI") or a Constant Power Device ("CPD") meter such as a top-of-line, high function, commercial or industrial electric meter (e.g., a GE kV2c) can influence the length of the polling schedule. In embodiments having an FCI, the FCI can flag a failed utility condition (e.g., for a power failure). In these embodiments, the FCI can offer a number of electrical options to meet the changing requirements of modern distribution systems.

The NMC 38 can communicate with the gateways 42 within a utility topology area (e.g., a feeder coverage area) across the second network 34. As shown in FIG. 3, the NMC 38 can transmit the reachability polling schedules to the appropriate gateways 42. In the illustrated embodiment of FIG. 3, Feeder 1 spans multiple gateways 42 (e.g., Gateway 1 and Gateway 2). In the illustrated embodiment of FIG. 3, CPDs M1 and M3 are associated with Gateway 1, CPD M6 is associated with Gateway 2 and is an FCI. In various embodiments and in different applications, any number of electronic utility devices 26 can be selected by either a gateway 42 or the NMC 38, to participate in the ODS task.

In a decentralized polling method, the identified electronic utility devices 26 in a gateway coverage area transmit information at preset polling schedules. The reachability schedule can also or alternatively be pre-transmitted to the electronic utility devices 26. In the illustrated embodiment of FIG. 3, Gateway 1 and/or Gateway 2 can add electronic utility devices 26 to a preset reachability polling schedule at regular intervals (e.g., every 5 minutes), or on ad-hoc schedule basis.

In embodiments having an FCI, the FCI can be an NIC-enabled faulted circuit indicator. As shown in FIG. 3, at least one of the electronic utility devices 26 (e.g., M8) can be a top-of-line, highly instrumented meter such as a GE kV2c. These types of devices in the gateway coverage area are ideal devices to participate in the ODS task. The transmitted message formats are explained below separately. In a normal polling sequence in decentralized operations, all or substantially all of the information necessary for the NMC 38 to identify the source, retrieve its operational status, and obtain meter locale power on/off conditions can be transmitted by the electronic utility device 26.

In a centralized polling method, the NMC 38 and/or a gateway 42 can access the identified utility devices 26 in the coverage area at any time and can extract status information. Status information can include any information on the electronic utility devices 26 being polled and/or any information the electronic utility devices 26 collect (e.g., metered commodities, temperature, messages or traffic from other electronic utility devices 26 connected across the first network 16, etc.). Message formats in both directions are explained herein separately. The NMC 38 and/or the gateway 42 can determine whether the identified electronic utility devices 26 being polled are reachable. Once this is established, (e.g., via an acknowledgement message from each of the electronic utility devices 26), the electronic utility devices 26 can send (either on their own or in response to a request) a follow-on message back to NMC 38, giving further operational status information.

If one or more electronic utility devices 26 fail to respond, the NMC 38 or the gateway 42 can poll neighboring electronic utility devices 26 of the non-responding electronic utility device 26, to obtain any available updates on the status of the non-responding electronic utility devices 26. Through these neighboring electronic utility devices 26, the NMC 38 can establish which electronic utility devices 26 and which part of the utility grid 14 are unreachable due to a power outage, network failure, or for other reasons. This information can be further supplemented by battery-powered electronic utility devices 26. In some embodiments, the battery-powered electronic utility devices 26 are self-reporting. Alternatively or in addition, the battery-powered electronic utility devices 26 can report in response to requests from the NMC 38.

Determining whether an outage has occurred, can be a configurable process. In some embodiments, utilities can input their own criteria and thresholds for different aspects of the measurable first network 16. For example, in some embodiments, utilities can specify what percentage of the electronic utility devices 26 being polled as unreachable in a pre-designated area of the utility grid 14 covered by the first network 16 is within operational norms. Alternatively or in addition, utilities can specify a configurable threshold, such that a possible outage event is triggered only when the percentage of the electronic utility devices 26 which are unreachable rises above the configurable threshold. Alternatively or in addition, the utilities can specify a number of electronic utility devices 26 being polled as unreachable that is within operational norms or a configurable threshold, such that a possible outage event is triggered only when the number of electronic utility devices 26 which are unreachable rises above the configurable threshold.

Alternatively or in addition, outage determination can be configured to include the number of electronic utility devices 26 (or the percentage of electronic utility devices 26) that respond with an indication of normal operation, or an indication indicating that there is no problem from an outage perspective. In some cases, an electronic utility device 26 may have a problem unrelated to outage determination. The ODS module 54 may be configured to include or exclude conditions, information, responses, etc. that are included in poll responses (or excluded from poll responses) as problems to more accurately classify outage events and to disregard non-outage events.

During normal operation, the ODS module 54 monitors the first network 16, which may involve any mix of passive or active monitoring. For example, the electronic utility devices 26 can be polled at some configurable interval/schedule. Alternatively or in addition, polling can be initiated in response to customer inquiries (e.g., telephone calls) or by a message received from one or more of the electronic utility devices 26 (e.g., when a battery-backed up device 26 begins operating on battery power).

The response from monitoring the first network 16 is applied against configurable outage threshold criteria. In the event the information obtained from monitoring the first network 16 meets the configurable outage threshold, the ODS module 54 can declare a possible outage and take prescribed action. The prescribed action can include conducting additional polling of electronic utility devices 26 in the first network 16, correlating the information obtained with additional information obtained from other sources (e.g., neighboring electronic utility devices 26), and/or comparing measured attributes from reachable electronic utility devices 26 on the first network 16.

The criteria for determining whether a possible outage exists, or declaring that an actual outage (e.g., a local service outage, a network-wide service outage, an equipment malfunction, or a power failure at a specific utility device 26) has occurred, as well as the actions taken in response to either condition can depend upon any criteria available to the first network 16. For example, in some embodiments, the first network 16 can be divided regionally, by communication type, meter type, premise type (residential, commercial, government, etc.), premise usage (high, low, intermittent), etc. Thus, different criteria for declaring an outage may be applied to different information received from the first network 16, and the outage declared may be declared for any portion of the first network 16, as defined by the configurable outage rules and criteria.

The criteria for declaring an outage can also or alternatively include weighting values for some or all of the electronic utility devices 26 based on the reliability of the various electronic utility devices 26 and/or the location of the electronic utility devices 26. In some embodiments, the criteria for declaring an outage can be adaptable or variable based on prior information received from each of the electronic utility devices 26 and/or the relative proximity of unreachable electronic utility devices 26. In these embodiments, prior information can be used to establish confidence or reliability levels for the various electronic utility devices 26.

Additionally, the response to a determination can also be configurable, allowing different responses to be taken for any electronic utility device 26, region or subset of the first network 16. In responding to a declaration of either a possible or an actual outage, the ODS module 54 can choose not to suspend normal operations (e.g., meter reading, etc.) and can conduct ODS-related demand polling and normal operations in parallel, with the ODS polling task given higher priority in the first network 16. This parallel operation utilizes an IPv6-based automated meter reading ("AMR") network. In some embodiments, the AMR network can include simple energy consumption data retrieval capabilities, and can also or alternatively include other capabilities such as outage detection and over-the-air meter programming. In some embodiments, IPv4 may be used as the packet format.

With reference to FIG. 4, the ODS module 54 can define an outage, utilizing a criterion that can be changed geographically (e.g., based on past history, weather, trees, etc.). The outage condition can be translated into outage threshold criteria (e.g., X devices per feeder coverage out). This information can be made available to the utility grid operations center 36, so that the utility can create its own ODS determination thresholds, establish canary devices 66 in the first network 16, and/or receive imminent failure (e.g., "last gasp") and async messages from any electronic utility devices 26 in the first network 16 informing the NMC 38 that it is facing power loss.

Based on the established criteria, the NMC 38 sets its own outage criteria for covering the polling (e.g., n % of electronic utility devices 26 per feeder or m electronic utility devices 26 per feeder). The criteria for programmatically configuring the polling list can be changed and/or updated as necessary.

Canary devices 66 and/or gateways 42 can also or alternatively ping or query the electronic utility devices 26. If the canary devices 66, gateways 42, and utility devices 26 involved in exception polling, return negative data (i.e., data indicating that an outage has not occurred), the NMC 38 ignores the previously received data and returns to normal operation. In some embodiments, even after receiving negative data, the NMC 38 can continue to poll at least some of the electronic utility devices 26 to confirm that an outage has not occurred.

If a number of electronic utility devices 26 greater than a threshold number do not respond to the pings and/or if the NMC 38 receives additional last gasp and async messages from electronic utility devices 26 alerting to a possible outage, the NMC 38 goes into full alert and triggers an "Exception Polling" mode. The NMC 38 can then suspend normal operations (e.g., automatic meter reading ("AMR") polling and the like), or slow normal operations. The NMC 38 then polls suspected electronic utility device groups and neighbors with short and/or quick polling messages directly and via neighboring electronic utility devices 26 to determine whether the reachability threshold is exceeded and whether the trigger percentage of electronic utility devices 26 are withdrawing from the feeder. In alternate embodiments, other conditions may trigger an "exception polling" mode. In other embodiments, the exception polling mode may be triggered according to one or more exception polling mode rules. Alternatively or in addition, during operation in the Exception Polling mode, the NMC 38 can operate according to predetermined performance rules and can poll pre-selected electronic utility devices 26, at least some of which may be rated as highly reliable.

The NMC 38 processes the polling information to determine the outage situation. If an outage condition is found, the NMC 38 can determine the extent of the outage condition and the location of the outage within the utility grid 14. The NMC 38 can also or alternatively identify the grid nodes (feeders, sub-stations, etc.) which are in the outage area, and can also or alternatively include the status of the grid nodes. In some embodiments, canary devices 66 may be installed at key grid nodes such as feeders, sub-stations 20, transformers 22 and the like. In some embodiments the canary devices 66 can include battery backup capability. In other embodiments, the canary devices 66 may not have battery backup capability.

After the reachability report is processed by the NMC 38, the NMC 38 can perform outage control and restoration operations. During such outage control and restoration operations, canary polling can be performed to confirm that the electronic utility devices 26 are back up and that information is passed on to the NMC 38. This information is used to return the first network 16 to normal operation, and some or substantially all exception polling is terminated. In the event of extensive outage and restoration (e.g., at least 5% of the electronic utility devices 26 experience failure conditions at any given time), the NMC 38 can conduct periodic check ups to reconfirm the network status.

Each of the electronic utility devices 26 can respond to different types of messages sent to the electronic utility device(s) 26 by the NMC 38 and/or the gateways 42. In some embodiments, the electronic utility devices 26 can change the structure of the messages based on normal operations or emergency operations (e.g., an outage). The type and content of messages, as well as the change in messages, can be configurable. The electronic utility devices 26 can also or alternatively be configured to send out "last gasp" messages following the occurrence of certain conditions, such as, for example, loss of power, tampering. Each message can have a different code.

With this polling process, the NMC 38 can establish the status of electric power distribution within the utility grid 14 and develop a "usage status map" of the whole grid service area. This data can be regularly updated. The selected electronic utility devices 26 in the field can report back to the NMC 38 regularly whether selected electronic utility devices 26 and their locations are receiving service (e.g., electric power, gas, etc.) or facing outage conditions. In embodiments having CPDs without battery backup, the NMC 38 can ping any CPD in the gateway areas and check for response (i.e., normal condition) or non-response (i.e., outage condition).

In some embodiments, there can be exceptions to this polling process. An exception can be described as either a receipt by a network management component (e.g., a gateway 42 and/or the NMC 38) of an asynchronous event (e.g., a TRAP or NOTIFICATION from a electronic utility device 26 that a power failure has occurred), a missed poll (i.e., a polled electronic utility device 26 does not respond to a poll), and/or a set or series of missed polls. In some embodiments, the NMC 38 can send exceptions upstream to the ODS module 54 and the ODS module 54, in turn, can initiate "exception" and/or "demand" polling. Alternatively, the NMC 38 and/or the gateways 42 can undertake this task independently, and report the results to ODS module 54.

An "exception" can occur when a gateway 42 transitions from AC power to DC power (i.e., when the gateway 42 is running on battery power). In some embodiments, such an exception can trigger a set of exception-based polls. Alternatively or in addition, such an exception can warrant interrupting some or all of the regularly scheduled activities (e.g., meter reads), and instead performing target sweeps/strobes of downstream infrastructure. It makes little sense to continue to attempt to read electronic utility devices 26 when the electronic utility devices 26 are unreachable or are likely to be unreadable.

For the purpose of building outage/restoration management functionality, the electronic utility devices 26 determine what triggers "storm" or "outage management" modes such that the ODS module 54 and the NMC 38 can focus on determining the extent of an outage and not contending with normal meter read traffic. A gateway 42 going from AC to DC power can trigger operation in the storm mode. Operation in the storm mode can also or alternatively be initiated when an FCI becomes unreachable, a battery-equipped end-of-line electronic utility device 26 becomes unreachable, and when 'n' percent of canary polling targets become unreachable.

Messages exchanged between an ODS system (e.g., a gateway 42 NMC 38, or a $3^{rd}$ party ODS) and electronic utility devices 26 within the utility grid 14 can be designed to quickly assess network failures, and to provide the ability to correlate the messages with outage topologies. Protocol efficiency can be gained by reducing message size, and also by providing correlation and compression within the first network 16. As discussed above, utility topologies can vary in terms of physical media, and therefore protocols can be stored at higher system layers, to allow the same application infrastructure to be reused and overlaid on many different physical media.

Multiple messages at different layers of the NMC 38 can be used as needed to quickly detect and efficiently correlate outages in the first network 16 with outages in the utility grid 14. The NMC 38 can guide product implementers so that their products will consistently work with other products. In some embodiments, the reference model defines seven layers of functions that take place at each end of a communication.

Link maintenance information in LAN 16, via monitoring of layer-2 messages, can be leveraged to quickly determine whether a neighboring electronic utility device 26 and/or a large set of neighboring electronic utility devices 26 have become unreachable. Layer 2 can be a data link layer of a multilayered communication model. The data link layer can move data across the physical links in the first network 16. The data link layer can ensure that an initial connection has been set up, divide output data into data frames, and handle the acknowledgements.

In the first network 16, a switch can redirect data messages at the Layer 2 level, using destination media access control ("MAC") addresses to determine where to direct the message. The data link layer can contain two sub layers (i.e., MAC and logical link control ("LLC")). MAC can be one of the sub-layers of the data link layer. The MAC protocols can ensure that signals sent from different stations across the same channel do not collide. MAC layer functionality can be built into the network adapter and can include a unique serial number that identifies each NIC.

At a third layer of the NMC 38 ("Layer 3") messages are exchanged to quickly assess across multiple physical media if an electronic utility device 26 is responding to messages, and is therefore alive and active. Layer 3 refers to the communications protocol that contains the logical address of a client or server station. Layer 3 can also be referred to as the "network layer" and can contain the address (IPv4, IPv6, etc.) inspected by a router that forwards it through the second network 34. Layer 3 can contain a type field so that traffic can be prioritized and forwarded based on message type as well as network destination.

At another layer of the NMC 38 ("Layer 7") messages are exchanged in order to assess grid metrics associated with the electronic utility devices 26, such as, for example, whether a device 26 is powered and/or whether neighboring network electronic utility devices 26 have dropped off the first network 16.

In order for electronic utility devices 26 to communicate across the first network 16, Layer 2 link maintenance with neighboring electronic utility devices 26 can constantly take place or can occur substantially constantly. Accordingly, network infrastructure devices 18 within the first network 16 will very quickly know if electronic utility devices 26 become unreachable or reboot. When an event affecting outage detection occurs, Layer 2 processes can provide an up call to Layer 7, and further outage detection logic can be completed.

Layer 3 messages can be used as an efficient method for assessing whether an electronic utility device 26 is responding to network traffic over multiple physical media. Layer 3 messages can be sent in the form of Internet control message protocol ("ICMP") echo traffic.

ICMP is a protocol of the Internet protocol suite. ICMP can be used by the operating systems of networked computers to send error messages indicating, for example, that a requested service is not available or that a host or router could not be reached. In some embodiments, the ODS module 54 or an agent of the ODS module 54 (e.g., a gateway 42) can send ICMP echo request messages and/or receive echo response messages to determine whether a device is reachable and how long packets take to get to and from that host.

Correlation of network failures to outages can be performed at the application layer. Information provided by operator loaded topologies, physically by an electronic utility device 26 and discovered by Layer 2 and/or Layer 3 messages, can be used to generate targeted messages to report and collect outage information. In some embodiments, there can be two categories of outage types (device status poll and device health exception).

The device status poll class of messages is acknowledged unicast messages, encapsulated in IPv6 and UDP, which are initiated by an upstream application to assess the "grid health" of an electronic utility device 26. An upstream application sends a "device status poll" request to an electronic utility device 26, and the electronic utility device 26 then responds with a set of health indicators, specifying local health (e.g. is the electronic utility device 26 powered), and neighborhood health (e.g. have neighboring electronic utility devices 26 recently become unreachable).

Device health exception messages are either acknowledged or unacknowledged unicast messages sent upstream to indicate a change in physical state of an electronic utility device 26 (e.g. whether the device 26 has lost power) or to indicate a change in network topology that may indicate an outage "in the neighborhood" (e.g. ten neighboring electronic utility devices 26 disappeared within a short time frame). Device health exceptions may be sent multiple times by a single electronic utility device 26, and can be proxied and coalesced by intermediate, "smart" electronic utility devices 26 which can correlate a large number of device health exceptions into a single health status representing an entire neighborhood of electronic utility devices 26.

Figure 5:
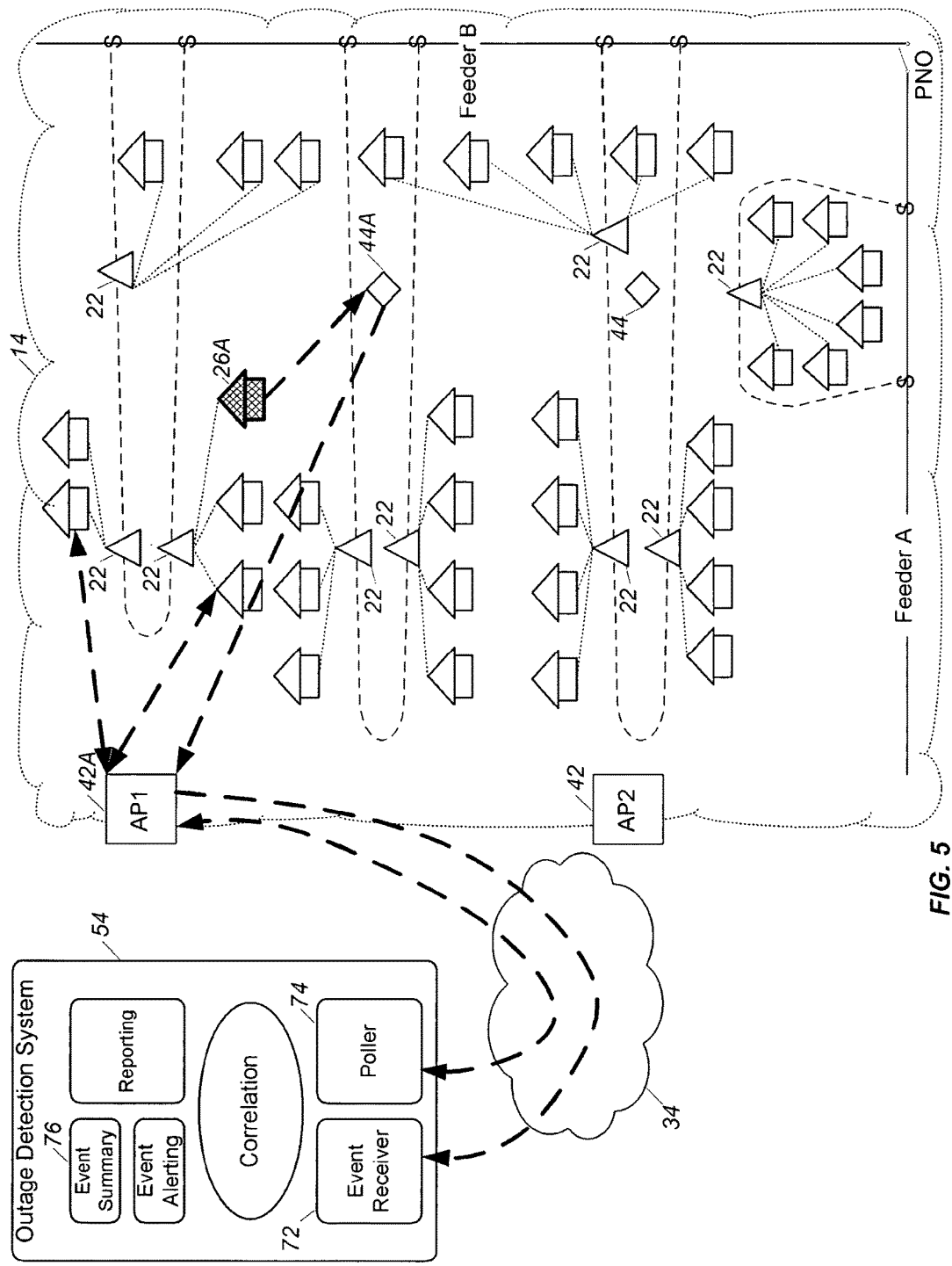
FIGS. 5-7 illustrate outage events and operation of the outage detection system of the present invention.
Figure 6:
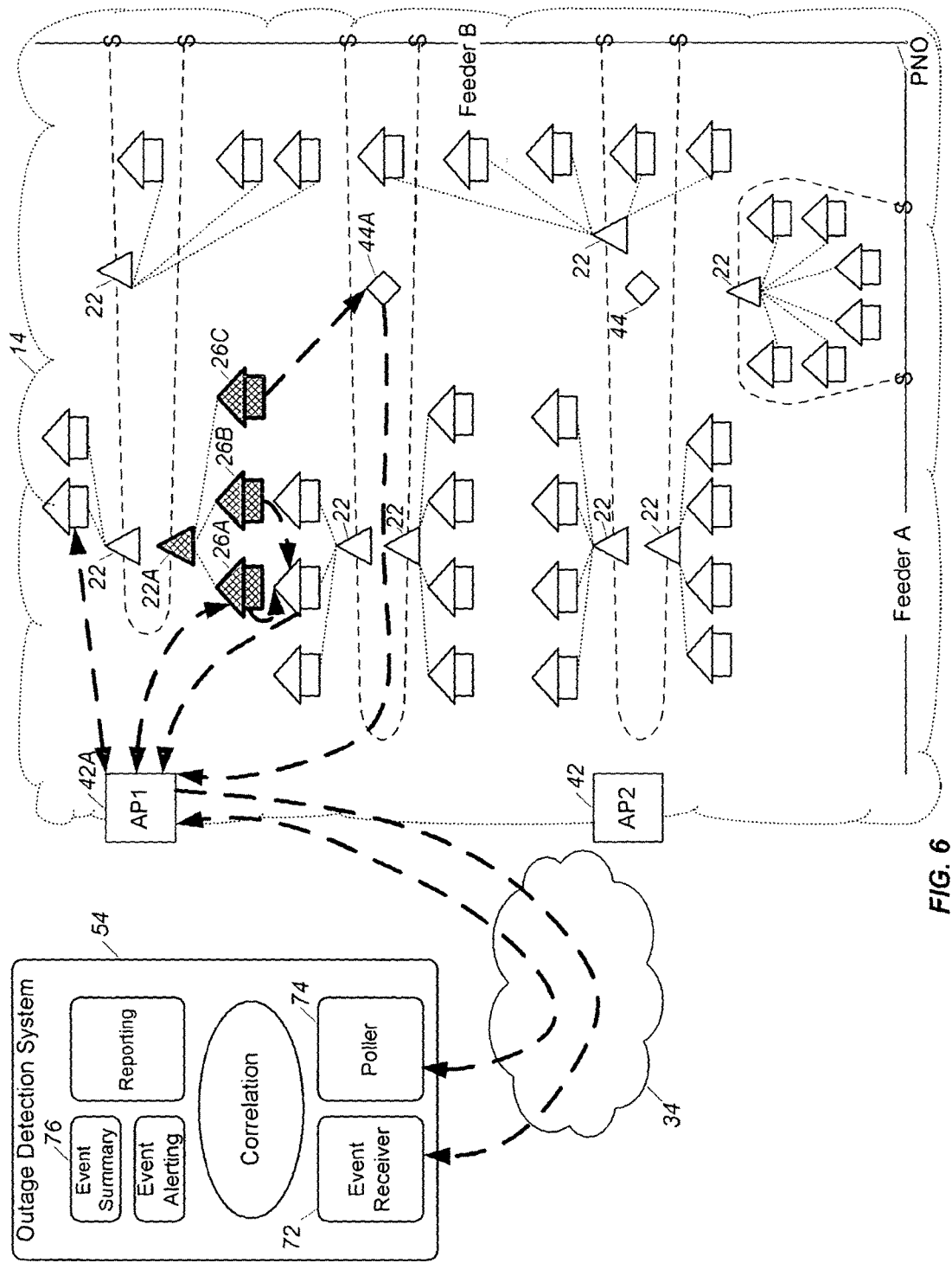
Figure 7:
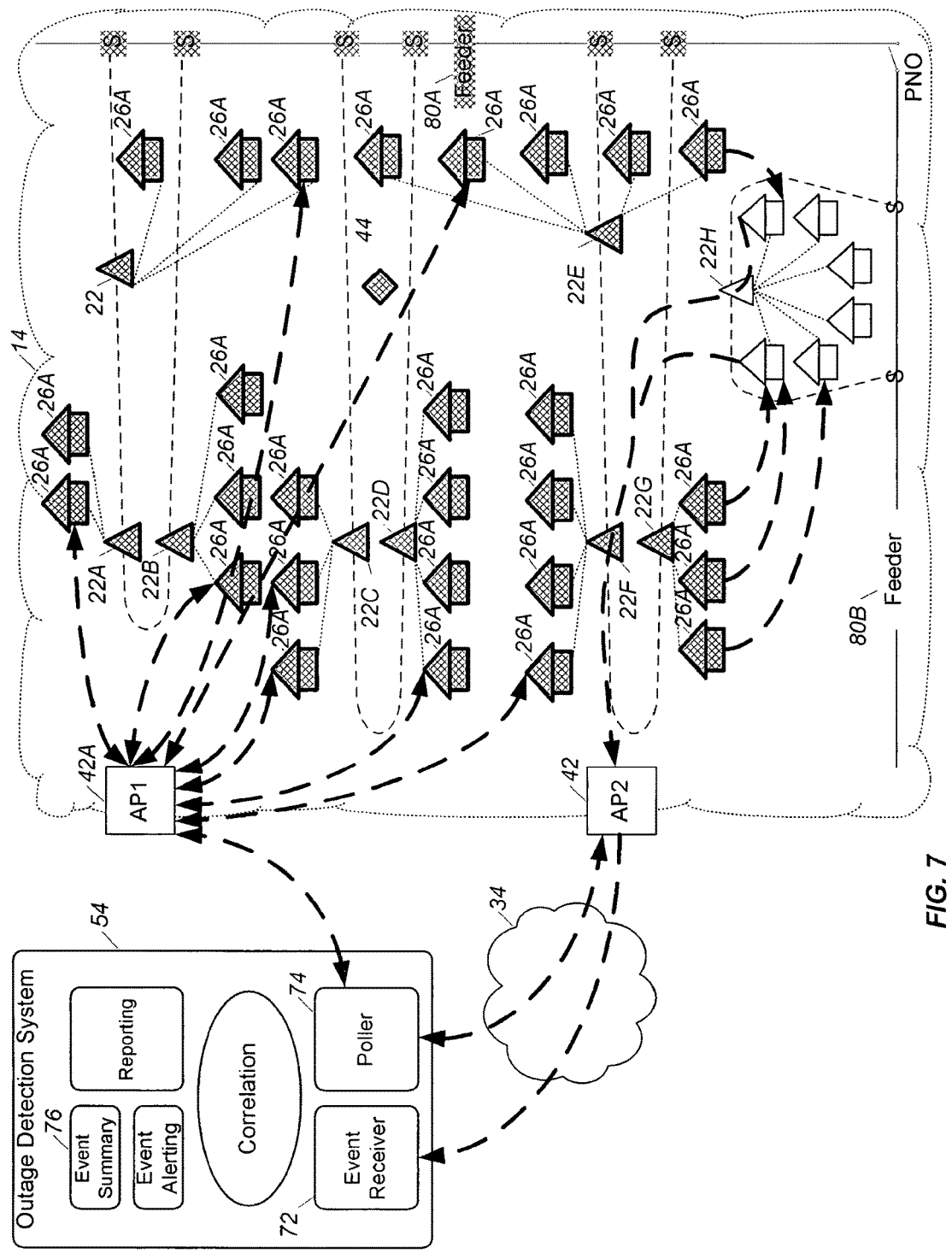

FIG. 5 illustrates operation of the ODS module 54 during an outage event. Specifically, a single electronic utility device 26A at a customer location (e.g., a residential building) is experiencing an outage. In FIGS. 5-7, fuses or circuit-breakers are identified with the character "S", underground power lines are illustrated with long dashed lines, service lines are illustrated with short dashed lines, and feeders are illustrated with solid lines. This is not to be confused with bold dashed lines which indicate ODS information flow.

In the illustrated example of FIG. 5, the electronic utility device 26A associated with the customer location sends an imminent failure warning across the first network 16 to the ODS module 54 to report the outage event. As described above, an outage event can be discovered and reported in a number of different manners. Accordingly, while reference is made herein to an imminent failure warning, it should be understood that the outage event could also or alternatively be reported and/or discovered in response to scheduled polling, customer telephone calls, periodic polling conduced by neighboring electronic utility devices 26 or neighboring network infrastructure devices 18, and/or other events and operations described above.

The electronic utility device 26A can transmit a Layer 2 imminent failure warning (e.g., a so-called "last gasp" message) directly to the ODS module 54 or an agent of the ODS module 54 using a predefined route. The electronic utility device 26A can also or alternatively transmit the imminent failure warning to a neighboring electronic utility device 26 or a neighboring network infrastructure device 18 (e.g., relay 44A in FIG. 5), which can then forward the message to the ODS module 54. In embodiments having an agent, the agent of the ODS module 54 can convert the Layer 2 message to a SNMP Layer 3 and forward the message to a gateway 42 (e.g., gateway 42A in FIG. 5) or the NMC 38. The gateway 42A can forward the message to an event receiver 72 of the ODS module 54.

In response to the imminent failure message, a poller 74 of the ODS module 54 transmits poll requests to and receives poll responses from electronic utility devices 26 similar to and in the neighborhood of the initiating electronic utility device 26A based on stored utility topology information. The ODS module 54 then correlates the results of the imminent failure warning and the polling requests to confirm that an outage has occurred at a single electronic utility device 26A corresponding to a single customer location. The ODS module 54 can then display the imminent failure warning and the source location corresponding to the reporting electronic utility device 26A in an event summary 76 so that appropriate corrective action can be initiated. Further, as the restoration action is taken and is completed, ODS module 54 can utilize additional polling data from the poller 74 to confirm that the service has been restored and can then display a message confirming that normal service has been restored.

FIG. 6 illustrates operation of the ODS module 54 during another outage event, which may be broader in scope and extent than the outage event illustrated in FIG. 5. Specifically, a transformer 22A providing service to a number of utility devices 26A, 26B, 26C at different customer locations is experiencing an outage. In the illustrated example of FIG. 6, the transformer 22A and/or the affected utility devices 26A, 26B, 26C can send imminent failure warning messages across the first network 16 to the ODS module 54 to report the outage event. Alternatively, a neighboring utility device 26, which is served by another normally functioning transformer 22, can send an outage report to the ODS module 54 via gateway 42A. As described above, an outage event can be discovered and reported in a number of different manners. Accordingly, while reference is made herein to an imminent failure warning, it should be understood that the outage event could also or alternatively be reported and/or discovered in response to scheduled polling, customer telephone calls, periodic polling conduced by neighboring electronic utility devices 26 or neighboring network infrastructure devices 18, and/or other events and operations described above.

The transformer 22A and/or the affected electronic utility devices 26A, 26B, 26C can transmit a Layer 2 imminent failure warning directly to the ODS module 54 using a predefined route. The affected electronic utility devices 26A, 26B, 26C and the transformer 22A can also or alternatively transmit the imminent failure warning to neighboring electronic utility devices 26 or neighboring network infrastructure devices 18 (e.g., relay 44A in FIG. 6), which can then forward the message to the ODS module 54. The network infrastructure device 18 (e.g., the relay 44A) can combine the Layer 2 messages into a single SNMP Layer 3 message and forward the message to a gateway 42 (e.g., gateway 42A in FIG. 6) or directly to the NMC 38. The gateway 42A can then forward the message to the event receiver 72 of the ODS module 54.

In response to the imminent failure message, the poller 74 of the ODS module 54 transmits poll requests to and receives poll responses from the affected electronic utility devices 26A, 26B, 26C and the affected transformer 22A and electronic utility devices 26 similar to and neighboring the affected electronic utility devices 26A, 26B, 26C and the affected transformer 22A based on stored utility topology information. The ODS module 54 then correlates the results of the imminent failure warning and the polling requests to confirm that a transformer-level outage has occurred and that the outage affects multiple customer locations. The ODS module 54 can then display the imminent failure warning and the source location corresponding to the transformer 22A in the event summary 76 so that appropriate corrective action can be initiated. Further, as the restoration action is taken and is completed, the ODS module 54 can utilize additional polling data from the poller 74 to confirm that normal service has been restored and can then display a message confirming that normal service has been restored. The use of the term "transformer-level outage" refers to an occurrence of an outage at some "level" of the utility hierarchy topology (e.g., a feeder, a lateral, a sub-station, etc.)

FIG. 7 illustrates operation of the ODS module 54 during yet another outage event, which may be broader in scope and extent than the outage events illustrated in FIGS. 5 and 6. Specifically, a feeder 80A providing service to a number of transformers 22A-22G and a number of utility devices (collectively "the affected utility devices 26A) at different customer locations within a neighborhood experiences an outage. In the illustrated example of FIG. 7, one or more of the transformers 22A-22G and/or one or more of the affected utility devices 26A can send imminent failure warning messages across the first network 16 to the ODS module 54 to report the outage event. As described above, an outage event can be discovered and reported in a number of different manners. Accordingly, while reference is made herein to an imminent failure warning, it should be understood that the outage event could also or alternatively be reported and/or discovered in response to scheduled polling, customer telephone calls, periodic polling conduced by neighboring electronic utility devices 26 or neighboring network infrastructure devices 18, and/or other events and operations described above.

The transformers 22A-22G and/or the affected electronic utility devices 26A can transmit a Layer 2 imminent failure warning to the ODS module 54 via other electronic utility devices 26 and/or other network infrastructure devices 18 (e.g., transformer 22H) not connected to the feeder 80A experiencing the outage. The network infrastructure device 18 (e.g., transformer 22H) can combine the Layer 2 messages into a single SNMP Layer 3 summary message and forward the message to a gateway 42 (not shown), or directly to the NMC 38. The gateway 42A can then forward the message to the event receiver 72 of the ODS module 54.

In response to the imminent failure message, the poller 74 of the ODS module 54 transmits poll requests to and receives poll responses from transformers 22A-22G, the affected electronic utility devices 26A, and electronic utility devices 26 and transformers 22 similar to and neighboring of the affected electronic utility devices 26A and the affected transformers 22A-22G based on stored utility topology information. The ODS module 54 then correlates the results of the imminent failure warning and the polling requests to confirm that a feeder outage has occurred and that the outage affects multiple transformers and multiple customer locations. The ODS module 54 can then display the imminent failure warning and the source location corresponding to the feeder 80A in the event summary 76 so that appropriate corrective action can be initiated. Further, as the restoration action is taken and is completed, the ODS module 54 can utilize additional polling data from the poller 74 to confirm that normal service has been restored and can then display a message confirming that normal service has been restored.

The embodiments described above and illustrated in the figures are presented by way of example only and are not intended as a limitation upon the concepts and principles of the present invention. Various features and advantages of the invention are set forth in the following claims.

What is claimed is:

1. A product delivery monitoring system comprising:
   a plurality of electronic devices configured to monitor delivery of a product; and
   a management processor configured to:
     enter a first polling mode;
     poll the plurality of electronic devices by transmitting a first polling message to the plurality of electronic devices via a first message format associated with the first polling mode,
     receive an input indicating a potential outage, and
     in response to receiving the input, enter an exception polling mode, and
     poll a subset of the plurality of electronic devices included in the plurality of electronic devices by transmitting a second polling message to the subset of the plurality of electronic devices via a second message format associated with the exception polling mode, wherein the second polling message is shorter than the first polling message.

2. The system of claim 1, wherein, when in the exception polling mode, the management processor is further configured to suspend the first polling mode.

3. The system of claim 1, wherein, when in the exception polling mode, the management processor is further configured to operate the first polling mode at a reduced rate.

4. The system of claim 1, wherein, when in the exception polling mode, the management processor is further configured to poll a group of electronic devices included in the plurality of electronic devices that are suspected of not receiving the product.

5. The system of claim 1, wherein, when in the exception polling mode, the management processor is further configured to poll a group of electronic devices included in the plurality of electronic devices that are neighboring an electronic device suspected of not receiving the product.

6. The system of claim 1, wherein, when in the exception polling mode, the management processor is further configured to:
   operate according to a predetermined set of rules; and
   poll a plurality of pre-selected electronic devices included in the plurality of electronic devices.

7. The system of claim 6, wherein the pre-selected electronic devices have been rated as reliable.

8. The system of claim 1, further comprising a gateway device linking the management processor to the plurality of electronic devices.

9. The system of claim 8, wherein the gateway device enters an exception polling mode following a transition from AC power to DC power.

10. The system of claim 1, wherein the management processor remains in the exception polling mode for a period of time following a determination that an outage is over.

11. The system of claim 1, wherein the management processor periodically enters the exception polling mode to verify that an outage has not occurred.

12. The system of claim 1, wherein the input comprises a health exception unicast message transmitted by a first electronic device included in the plurality of electronic devices.

13. The system of claim 12, wherein an intermediate electronic device proxies and coalesces a plurality of health exception messages and correlates the plurality of health exception messages into a single health exception message representing a neighborhood of electronic devices included in the plurality of electronic devices.

14. The system of claim 1, wherein an electronic device included in the plurality of electronic devices responds to the second polling message with at least one of a local health indication and a neighborhood health indication.

15. The system of claim 1, wherein the management processor is further configured to evaluate responses in the exception polling mode based on a historical performance of the subset of the plurality of electronic devices.

16. A method of polling a plurality of electronic devices associated with a product delivery system by a network management center having an outage detection module and a management module, the method comprising:
   entering a first polling mode;
   polling, by the network management center, the plurality of electronic devices by transmitting a first polling message to the plurality of electronic devices via a first message format associated with a first polling mode;
   receiving, at the network management center, an input indicating a potential outage; and
   in response to receiving the input, entering a second polling mode, and polling, by the network management center, a subset of the plurality of electronic devices included in the plurality of electronic devices by transmitting a second polling message to the subset of the plurality of electronic devices via a second message format, wherein the second polling message is shorter than the first polling message.

17. The method of claim 16, further comprising suspending the first polling mode when in the second polling mode.

18. The method of claim 16, further comprising reducing a rate at which the first polling mode operates when in the second polling mode.

19. The method of claim 16, further comprising, when in the second polling mode, polling a group of electronic devices included in the plurality of electronic devices that are neighboring an electronic device suspected of not receiving the product.

20. The method of claim 16, further comprising rating a subset of the plurality of electronic devices as highly reliable based on the first polling mode, and polling the subset of the plurality of electronic devices in the second polling mode.

21. The method of claim 16, further comprising remaining in the second polling mode for a period of time following a determination that an outage is over.

22. The method of claim 16, wherein the input comprises a health exception unicast message transmitted by a first electronic device included in the plurality of electronic devices.

23. The method of claim 22, further comprising proxying, coalescing, and correlating a plurality of health exception message by an intermediate electronic device into a single health exception message representing a neighborhood of electronic devices included in the plurality of electronic devices.

* * * * *